United States Patent [19]

Dessouroux

[11] 4,439,078

[45] Mar. 27, 1984

[54] ASSEMBLY SLEEVE FOR FIXING A SCREW IN AN OBJECT, PARTICULARLY OF A SOFT MATERIAL

[75] Inventor: Alexis A. J. F. Dessouroux, Spa, Belgium

[73] Assignee: Shur-Lok International SA, Petit Rechain, Belgium

[21] Appl. No.: 351,892

[22] Filed: Feb. 24, 1982

Related U.S. Application Data

[63] Continuation of Ser. No. 127,084, Mar. 4, 1980, abandoned.

[30] Foreign Application Priority Data

Mar. 15, 1979 [FR] France ................................ 79 06611

[51] Int. Cl.³ .............................................. F16B 37/12
[52] U.S. Cl. .................................... 411/178; 411/38; 411/183; 29/426.5; 29/523
[58] Field of Search ............... 411/178, 180, 181, 177, 411/176, 183, 38, 34, 282; 29/523, 522 R

[56] References Cited

U.S. PATENT DOCUMENTS

| | | | |
|---|---|---|---|
| 2,670,021 | 2/1954 | Torresen et al. | 411/178 X |
| 3,030,705 | 4/1962 | Gill | 411/34 X |
| 3,145,751 | 8/1964 | Boots | 411/282 |
| 3,180,386 | 4/1965 | Bynum | 411/178 |
| 3,270,793 | 9/1966 | Polmon | 411/180 |
| 3,280,874 | 10/1966 | Rosan | 411/178 |
| 3,371,402 | 3/1968 | Neuschotz | 411/167 X |
| 3,512,328 | 5/1970 | Eriksson | 411/339 X |
| 3,948,142 | 4/1976 | McKay et al. | 411/38 |

FOREIGN PATENT DOCUMENTS 2002866  2/1979  United Kingdom ............... 411/178

Primary Examiner—Gary L. Smith
Assistant Examiner—Neill Wilson
Attorney, Agent, or Firm—Holman & Stern

[57] ABSTRACT

An insertable threaded sleeve provided with an outer screwthread and an inner screwthread for a screw, the outer screwthread being adapted to the screwthread of a tapped hole in an object. An extension adapted to be deformed by a buckling so as to be locked in the screwthread of the hole is provided with an outer knurling which improves the engagement thereof with the screwthread of the tapped hole and a flange on the outer end. The sleeve is replaceable and can be used in particular when the object is made from a soft material whereas the screw is made from a hard material. It may have if desired means for locking the screw against rotation.

6 Claims, 6 Drawing Figures

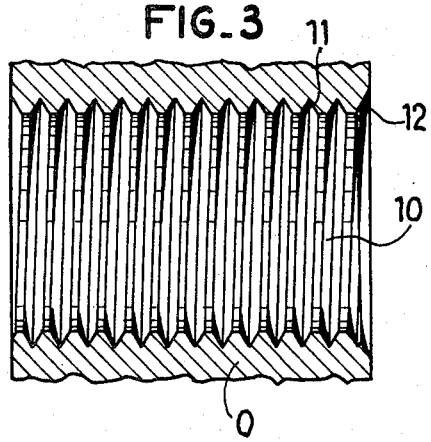
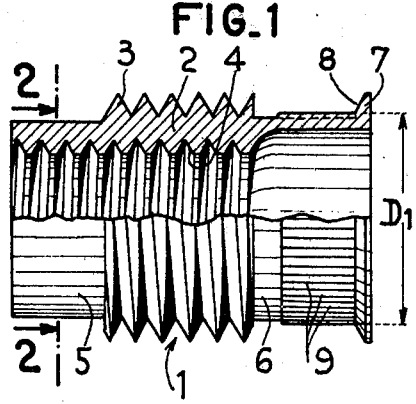
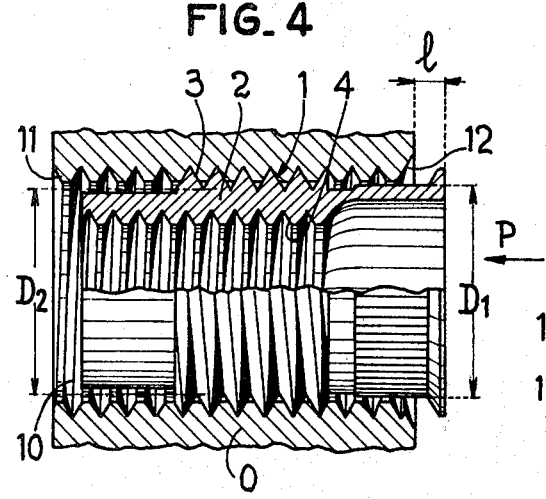
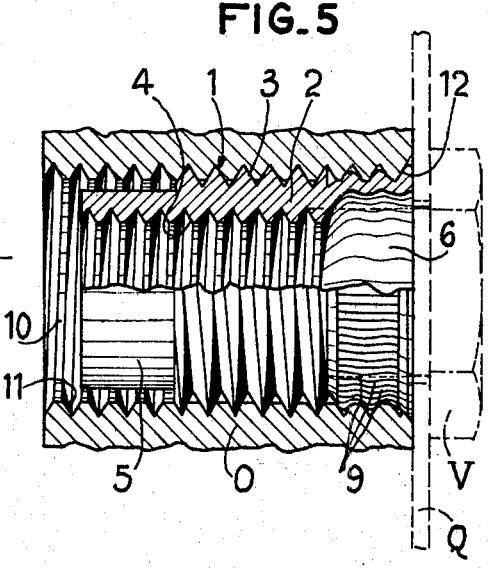
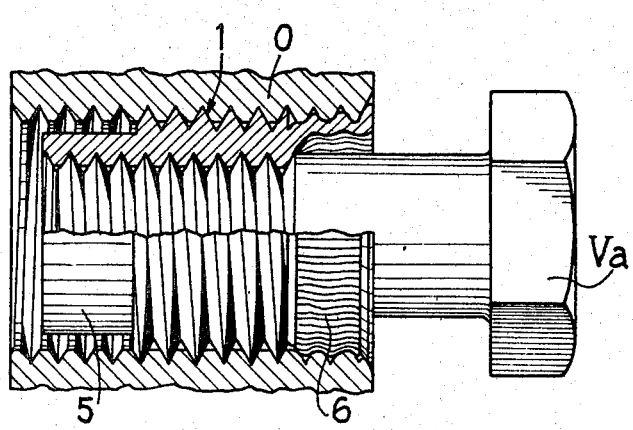
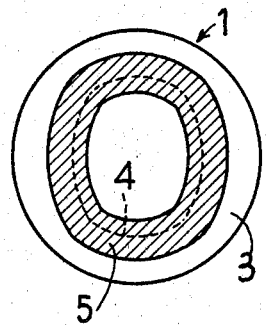

ASSEMBLY SLEEVE FOR FIXING A SCREW IN AN OBJECT, PARTICULARLY OF A SOFT MATERIAL

This is a continuation of application Ser. No. 127,084, filed Mar. 4, 1980, now abandoned.

DESCRIPTION

BACKGROUND OF THE INVENTION

Field of the Invention

The present invention relates to an insert sleeve for fixing a screw in an object which is particularly of a soft material.

Description of the Prior Art

In the case of the fixing of parts on objects of a soft material, such as aluminium, plastics material, etc., difficulties are frequently encountered when the parts must be mounted and removed frequently. Indeed, these operations rapidly result in a deterioration of the screwthreads of the tapped holes formed in the object of a soft material, above all when the fixing screws are of a relatively hard material such as steel. It is already known to place in tapped holes formed in objects, assembly sleeves which are screwed in these tapped holes and serve as an intermediate part, interposed between the object of a soft material with which it is rendered rigid and the fixing screw which may be removed or remounted as many times as is desired without deteriorating in any way the screwthread of the tapped hole of this object. Further, it would be desirable that the sleeve itself be also replaceable, since it is of course also subject to wear when the mounting and removal occur very frequently.

French patent No. 1 308 201 describes a sleeve comprising a screwthread adapted to that of a tapped hole of the object, an inner screwthread adapted to a screw or other like member, and, at one of its ends, a cylindrical extension which is devoid of screwthreads and has an outside diameter which is equal to, or less than, the minor diameter of the outer screwthread of the sleeve.

When this sleeve is mounted in the object, the extension devoid of screwthreads is urged outwardly against the inner wall of the hole by a tool or punch which bears against an annular radial shoulder formed inside the extension. The force exerted by the tool then causes an upsetting or flow of the metal of the extension which, in deforming the entrance of the hole, is supposed to become intimately connected to the metal of the object. The deformation of the metal both of the extension and of the entrance of the hole thus corresponds to a flow, the deformation being progressive and following the progression of the tool. This sleeve of the prior art has in particular the following drawbacks.

As the metal of the extension is urged radially outwardly by a punch, the inside diameter of the extension must satisfy close tolerances so that the manufacture of the sleeve is expensive. The same is true in respect of the outside diameter which must be very precisely adapted to the diameter of the entrance of the hole formed in the object.

Moreover, owing to the flow of the metal of the extension and of the wall of the hole at the entrance of the latter, there is created not only a radial but also an axial locking, the bead formed externally on the extension preventing any subsequent removal of the sleeve. The latter consequently cannot be replaced. Other prior patents such as French patents No. 1 506 720, 1 416 714 and 2 400 139, disclose sleeves which have either or both of the aforementioned drawbacks.

SUMMARY OF THE INVENTION

Consequently, an object of the invention is to provide a sleeve of the type described hereinbefore, wherein said extension terminates in an outer annular ledge adapted to act as a support for a tool which exerts an axial force when mounting the sleeve, it being thus possible to deform this extension by an outward buckling so as to lock it in the corresponding threads of the tapped hole of the object.

As a result of these features, the sleeve is locked in the hole of the object by a buckling of the metal of the extension, which phenomenon is known to be essentially sudden as opposed to a flow which is on the contrary a progressive phenomenon. The buckling is achieved by an exclusively axial force exerted on the ledge of the extension which, beyond a certain limit, suddenly deforms the latter so as to apply the material in the threads of the hole. Upon the buckling of the extension, the elastic limit of the metal is very distinctly exceeded so that when the mounting tool is withdrawn, the extension has absolutely no tendency to return more or less to its initial shape which would weaken the resistance to rotation of the sleeve. In contrast to this, in the prior art in which a radial force is exerted on the extension, the metal may withdraw after deformation owing to the fact that the metal has not exceeded its elastic limit and has been merely urged radially outwardly.

Another advantage resulting from the features of the invention results in the fact that the extension has no need to possess precise dimensions, since in the course of the buckling, the metal is deformed outwardly until it is stopped by the wall of the hole.

Even after several replacements of the sleeve which inevitably more or less deteriorates the threads of the hole, the metal is adapted by the buckling to the shape of the wall of this hole. Consequently, sleeves of the same dimensions may always be employed.

Lastly, the sleeve may be very easily replaced since the extension is adapted to the screw thread of the hole of the object and the assembly can be consequently unscrewed without trouble.

BRIEF DESCRIPTION OF THE DRAWINGS

Further features and advantages of the invention will be apparent from the ensuing description which is given merely by way of example with reference to the accompanying drawing in which:

FIG. 1 is a partially elevational and partially sectional view of an insert sleeve according to the invention;

FIG. 2 is a cross-sectional view taken on line 2—2 of FIG. 1 of the inner portion of the sleeve according to the invention;

FIG. 3 is a cross-sectional view of a portion of an object of a soft material in which a tapped hole has been formed and receives the sleeve according to the invention;

FIG. 4 is a cross-sectional view showing this portion of the object in the course of the mounting of the sleeve;

FIG. 5 is a view similar to FIG. 4, the sleeve having been fixed in the tapped hole of the object, and FIG. 6 is a similar cross-sectional view illustrating the removal of the sleeve according to the invention.

DETAILED DESCRIPTION

FIGS. 1 and 2 show the preferred embodiment of the insert sleeve according to the invention.

The sleeve 1, which has a generally cylindrical shape, comprises three portions, namely:

an intermediate portion 2 provided with an outer screwthread 3 and an inner screwthread 4;

an end portion 5 (FIG. 2) having a roughly elliptical shape and devoid of an outer screwthread but in which the inner screwthread 4 is extended; this portion is essentially adapted to form a screwthread locking means;

an end portion or extension 6 which is devoid of any screwthread and has an outside diameter $D_1$ which is equal to or less than the minor diameter $D_2$ (FIG. 4) of the outer screwthread 3 of the sleeve.

The extension 6 has a circular section and terminates in a radial flange 7 which extends outwardly and has a rear face 8 of frustoconical shape.

Further, the extension 6 has a knurling on its outer surface which is for example formed by axial ribs 9.

FIG. 3 shows a portion of an object O to which a part must be fixed by means of a screw. For this purpose, this object O is provided with a blind or throughway hole 10 in which is tapped a screwthread 11. A chamfer 12 is preferably provided at the entrance of this tapped hole 10. The object O may in particular be made from a soft or ductile material such as aluminium, plastics material, etc., whereas the sleeve is made preferably of a material which is relatively hard while being easily deformable. Steel, for example, is suitable.

FIGS. 4 and 5 show the mounting of the sleeve in the tapped hole 10 of the object.

The sleeve 1 is engaged by its outer screwthread 3 in the inner screwthread 11 of the hole 10 until such penetration has been achieved that the extension 6 of the sleeve 1 extends beyond the plane of the entrance face of the hole 10 by a given length l which depends on the dimensions and the locking characteristics required of the sleeve 1.

Thereafter, an axial pressure P may be exerted on its flange 7 by means of a mallet or, better still, by means of a rivetting chuck engaged in the inner screwthread 4 of the sleeve 1.

The extension 6, whose wall thickness is less than that of the remainder of the sleeve 1, expands under the effect of the force P and plastically deforms by buckling beyond the elastic limit of the metal and causes the outer ribs 9 to bite into the first threads of the entrance of the inner screwthread 11 of the hole 10. As soon as the flange 7 of the sleeve 1 comes in contact with the chamfer 12 of the hole 10, the mounting is terminated and the sleeve is ready for use.

FIG. 5 shows a finished assembly of an object O and a plate Q by means of a screw V which is engaged in the inner screwthread 4 of the sleeve 1. Owing to the deformed elliptical portion 5, this screw is locked in the sleeve 1.

Thus it can be seen that the sleeve 1 may be mounted in a tapped hole of any object provided that this hole has a screwthread of suitable dimensions and, if desired, a chamfer at its entrance so as to adapt therein the flange 7 of the sleeve 1. Apart from this possible chamfer, the object O has consequently no need of any special preparation comprising either forming therein an entrance counterbore or tapping to a very precise depth or other operations.

Note, moreover, that the sleeve according to the invention may be employed very advantageously for achieving a locking of a screw in a solid object. Indeed, the usual means for locking a screw in a tapped hole is to deform in some way the female parts of the screwthread. When this female part is in a solid object, the deformation of the screwthread is of course impossible. It is then necessary to have a special member, such as a lock washer or other means which may be deformed and ensures the locking of this screw relative to the object.

The sleeve according to the invention avoids the use of such an intermediate screw locking member.

FIG. 6 illustrates a very convenient manner of removing the sleeve according to the invention. Such a removal may be necessary after a great number of screwings of the screw V (FIG. 5) which might deteriorate the inner screwthread 4 of the sleeve 1.

As shown in FIG. 6, the removal of the sleeve 1 requires the use of a simple bolt Va which is screwthreaded only partly on a length approximately equal to the length of the inner screwthread 4 of the sleeve 1.

It is sufficient, by a rotation of the bolt, to engage it throughout its screwthreaded length in the inner screwthread 4 of the sleeve 1.

This movement of rotation is continuous and has for effect, bearing in mind that the screwthread of the bolt Va is fully engaged in the sleeve 1, to simultaneously drive the bolt Va and the sleeve 1 while jamming the latter on the screw Va, since the diameter of the stem of the bolt is larger than the minor diameter of the inner screwthread 4.

Consequently, the sleeve 1 has a tendency to progress in the inner screwthread 11 of the hole 10 and consequently to detach its knurled portion 9 from the screwthread 11 owing to the tensile force exerted on the sleeve. Indeed, the flange 7 cannot progress in the screwthread 11 of the hole 10 since it abuts against the outer face of the object and there results a plastic deformation of the sleeve 1 which as it were unbuckles it and tends to put it back into its initial configuration shown in FIG. 1.

As soon as the knurling 9 is detached from the screwthread 11 of the hole 10, it is possible to disengage the assembly of the screw Va and the sleeve 1 from the hole 10 by rotating it in the opposite direction. The hole 10 is then ready to receive a new sleeve 1. The latter is therefore easily replaceable.

Having now described my invention what I claim as new and desire to secure by Letters Patent is:

1. In an insert sleeve for interposition between a screw and a tapped hole of an object, in particular of a soft material, said sleeve comprising an outer screwthread adapted to the screwthread of the tapped hole, an inner screwthread adapted to the screwthread of said screw, and a cylindrical extension portion adjacent an end of the sleeve, which extension portion is devoid of screwthreads and has an outside diameter which is no larger than the minor diameter of the outer screwthread of the sleeve, said extension portion comprising a ribbed outer cylindrical surface and provided for axial compression and buckling to produce a radially outward deformation against the screwthead of said tapped hole to prevent rotation of the sleeve; the improvement comprising means for facilitating and accelerating a disengagement of said ribbed outer surface from the screwthread of the tapped hole, subsequent to said outer deformation thereof, when it is desired to remove the sleeve from the tapped hole, said facilitating and accelerating means comprising an outer circular annular and smooth flange on an outer end of the extension portion, the annular flange having an outside diameter exceeding the minor diameter of the outer screwthread of the sleeve so as to be capable of axially bearing against said object and acting as an abutment which, when rotated relative to said object, is non-destructive of the material of said object and prevents further penetration of said outer end portion into the tapped hole when screwing the rest of the sleeve still further into the tapped hole in the conventional manner by means of a bolt or the like which is jammed in said inner screwthread of the sleeve for rotating the sleeve for disengaging said buckled ribbed outer surface from the screwthread of the tapped hole, the extension portion having an inside diameter larger than the major diameter of said inner screwthread, said outer flange constituting reinforcing means for said outer end which facilitate the production of said outer deformation by an axial compression and buckling on said extension portion merely by application of axial force on said flange.

2. A sleeve as claimed in claim 1, wherein a face of said flange facing the outer screwthread of the sleeve has a frustoconical shape which is adapted to a shape of a recess formed around the entrance of the tapped hole of the object.

3. A sleeve as claimed in claim 1 or 2, comprising thread locking means for preventing rotation of the screw engaged in the sleeve.

4. A sleeve as claimed in claim 3, wherein said thread locking means comprise an end portion of the sleeve remote from said extension portion and having a substantially elliptical cross-sectional shape.

5. In an assembled structure comprising an object having a tapped hole, a screw, a member attached to the object by means of the screw, and an insert sleeve interposed between the screw and the tapped hole, the sleeve comprising an outer screwthread screwthreadedly engaged with the screwthread of the tapped hole, an inner screwthread screwthreadedly engaged with the screwthread of the screw and a cylindrical extension portion adjacent an outer end of the sleeve relative to the object, the extension portion, before assembly with the object, being devoid of screwthreads and comprising a ribbed outer cylindrical surface which is subsequently radially outwardly deformed against the screwthreads of said tapped hole by a buckling of the extension portion for preventing rotation of the sleeve in the tapped hole; the improvement comprising means for facilitating and accelerating a disengagement of said ribbed outer surface from the screwthread of the tapped hole, subsequent to said outer deformation thereof, when it is desired to remove the sleeve from the tapped hole, said facilitating and accelerating means comprising an outer circular annular and smooth flange on an outer end of the extension portion, the annular flange having an outside diameter exceeding the minor diameter of the outer screwthread of the sleeve so as merely to axially bear against said object and act as an abutment which, when rotated relative to said object, is non-destructive of the material of said object prevents further penetration of said outer end into the tapped hole when screwing the rest of the sleeve still further into the tapped hole in the conventional manner by means of a bolt or the like which is inserted after removal of said screw and screwed to a jammed position in said inner screwthread of the sleeve for thereafter rotating the sleeve for disengaging said buckled ribbed outer surface from the screwthread of the tapped hole, the extension portion having, before assembly with the object, an inside diameter larger than the major diameter of said inner screwthread of the sleeve, the extension portion being, in the relative positions of the object, sleeve and screw in the assembled structure, in an axially compressed condition with an associated buckling thereof which results in said radially outward deformation of the ribbed surface of the extension portion, the tapped hole having a depth exceeding the depth of penetration of the sleeve in the tapped hole to an extent sufficient to allow withdrawal of the sleeve from the tapped hole by said screwing of the sleeve further into the tapped hole which permits substantially unbuckling of the extension portion.

6. In an insert sleeve for interposition between a screw and a tapped hole of an object, in particular of a soft material, said sleeve comprising an outer screwthread adapted to the screwthread of the tapped hole, an inner screwthread adapted to the screwthread of said screw, and a cylindrical extension portion adjacent an end of the sleeve, which extension portion is devoid of screwthreads and has an outside diameter which is no longer than the minor diameter of the outer screwthread of the sleeve and is provided for axial compression and buckling to produce a radially outward deformation against the screwthread of said tapped hole to prevent rotation of the sleeve in said tapped hole; the improvement comprising means for facilitating and accelerating a disengagement of said extension portion from the screwthread of the tapped hole, subsequent to said outer deformation thereof, when it is desired to remove the sleeve from the tapped hole, said facilitating and accelerating means comprising an outer circular annular and smooth flange on an outer end of the extension portion, the annular flange having an outside diameter exceeding the minor diameter of the outer screwthread of the sleeve so as to be capable of axially bearing against said object and acting as an abutment which, when rotated relative to said object, is non-destructive of the material of said object and prevents further penetration of said outer end into the tapped hole when screwing the rest of the sleeve still further into the tapped hole in the conventional manner by means of a bolt or the like which is jammed in said inner screwthread of the sleeve for rotating the sleeve for disengaging said extension portion from the screwthread of the tapped hole, the extension portion having an inside diameter larger than the major diameter of said inner screwthread and said outer flange constituting reinforcing means for said outer end which facilitate the production of said outer deformation by an axial compression and buckling of said extension portion merely by application of axial force on said flange.

* * * * *